(12) United States Patent
Mori

(10) Patent No.: US 8,693,011 B2
(45) Date of Patent: Apr. 8, 2014

(54) INFORMATION PROCESSING APPARATUS AND METHOD FOR CONTROLLING SAME

(75) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/358,893

(22) Filed: Jan. 26, 2012

(65) Prior Publication Data

US 2012/0200873 A1 Aug. 9, 2012

(30) Foreign Application Priority Data

Feb. 9, 2011 (JP) ................................. 2011-026529

(51) Int. Cl.
*G06F 15/00* (2006.01)
(52) U.S. Cl.
USPC ....................................................... 358/1.12
(58) Field of Classification Search
USPC ....................................................... 358/1.12
See application file for complete search history.

(56) References Cited

U.S. PATENT DOCUMENTS

2005/0060650 A1* 3/2005 Ryan et al. .................... 715/526
2006/0238786 A1* 10/2006 Sakura et al. .................. 358/1.9

FOREIGN PATENT DOCUMENTS

JP 2009-269310 A 11/2009

* cited by examiner

*Primary Examiner* — Saeid Ebrahimi Dehkordy
(74) *Attorney, Agent, or Firm* — Carter, DeLuca, Farrell & Schmidt LLP

(57) ABSTRACT

An information processing apparatus and method control execution of jobs performed by a printing apparatus and by a post-processing apparatus that performs a post-processing in which printed matters printed by the printing apparatus are used. Based on a plurality of jobs that designate the execution of printing with the printing apparatus and a post-processing with the post-processing apparatus, the apparatus acquires post-processing step information for the post-processing apparatus designated by the jobs, as well as sheet feed/discharge information related to paper feed to the post-processing apparatus and paper discharge from the post-processing apparatus, and determines whether the front of the printed matter discharged from the printing apparatus is face-up or face-down, as well as the order in which the jobs are to be executed in the post-processing on the basis of the post-processing step information and the sheet feed/discharge information.

9 Claims, 14 Drawing Sheets

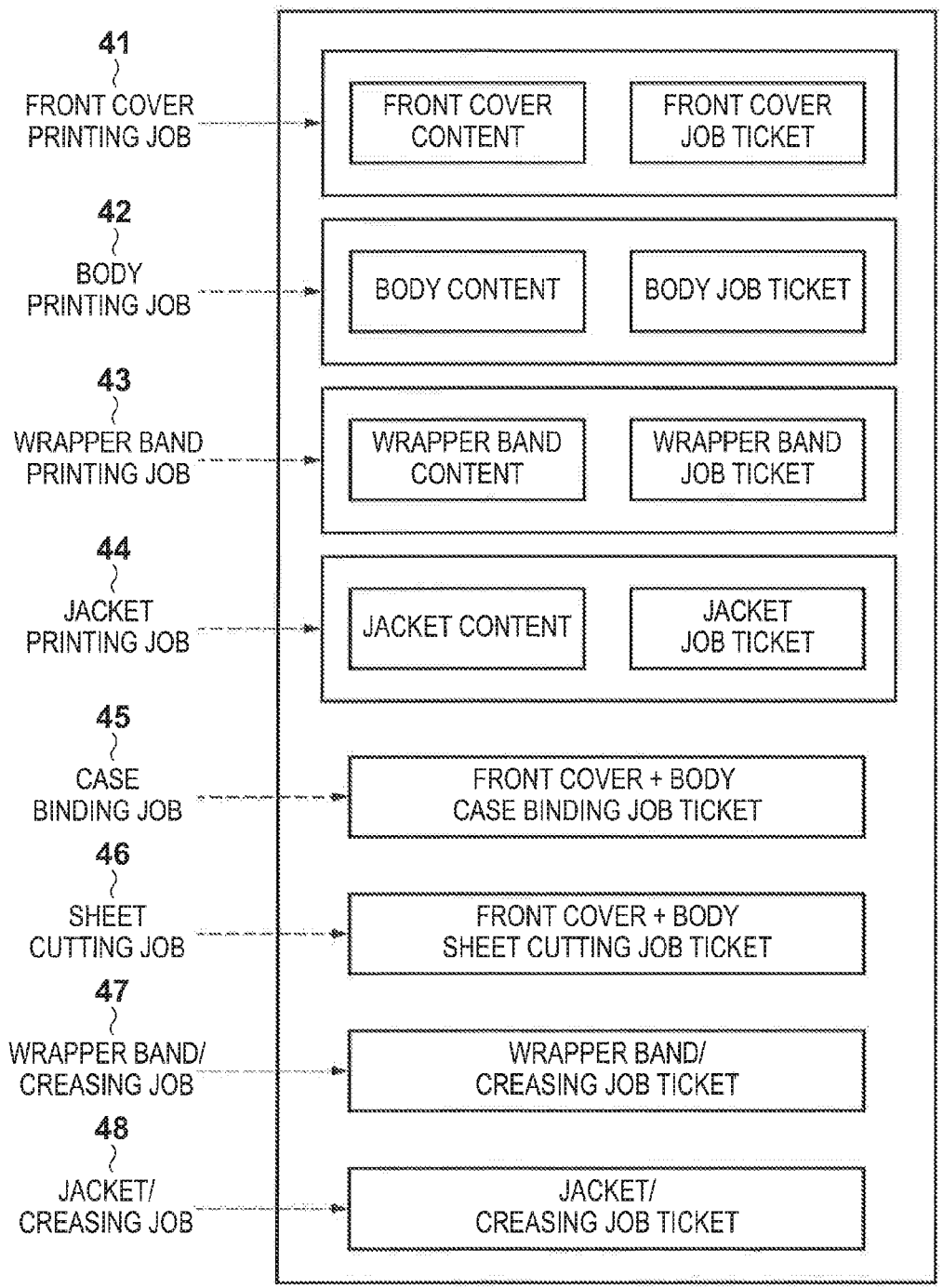

FIG. 5

| PART NAME | PAGE CONFIGURATION | POST-PROCESSING STEP 1 | | POST-PROCESSING STEP 2 | | POST-PROCESSING STEP 3 | |
|---|---|---|---|---|---|---|---|
| | | POST-PROCESSING APPARATUS NAME | PAPER FEED INFORMATION | POST-PROCESSING APPARATUS NAME | PAPER FEED INFORMATION | POST-PROCESSING APPARATUS NAME | PAPER FEED INFORMATION |
| FRONT COVER | SINGLE PAGE | LAMINATOR | FACE-DOWN FEED | SHEET CUTTING DEVICE | | SHEET CUTTING DEVICE | FACE-UP FEED |
| BODY | MULTIPLE PAGES | CASE BINDING DEVICE | NONE | – | | – | |
| WRAPPER BAND | SINGLE PAGE | CREASING MACHINE | FACE-DOWN FEED | – | | – | |
| JACKET | SINGLE PAGE | LAMINATOR | FACE-DOWN FEED | CREASING MACHINE | FACE-DOWN FEED | – | |

| POST-PROCESSING APPARATUS NAME | PAPER FEED INFORMATION | PAPER DISCHARGE INFORMATION |
|---|---|---|
| LAMINATOR | FACE-DOWN FEED | SAME ORIENTATION AS FEED |
| CASE BINDING DEVICE | FACE-DOWN FEED | NONE |
| SHEET CUTTING DEVICE | FACE-UP FEED | DIFFERENT ORIENTATION FROM FEED |
| CREASING MACHINE | FACE-UP FEED FACE-DOWN FEED | SAME ORIENTATION AS FEED |

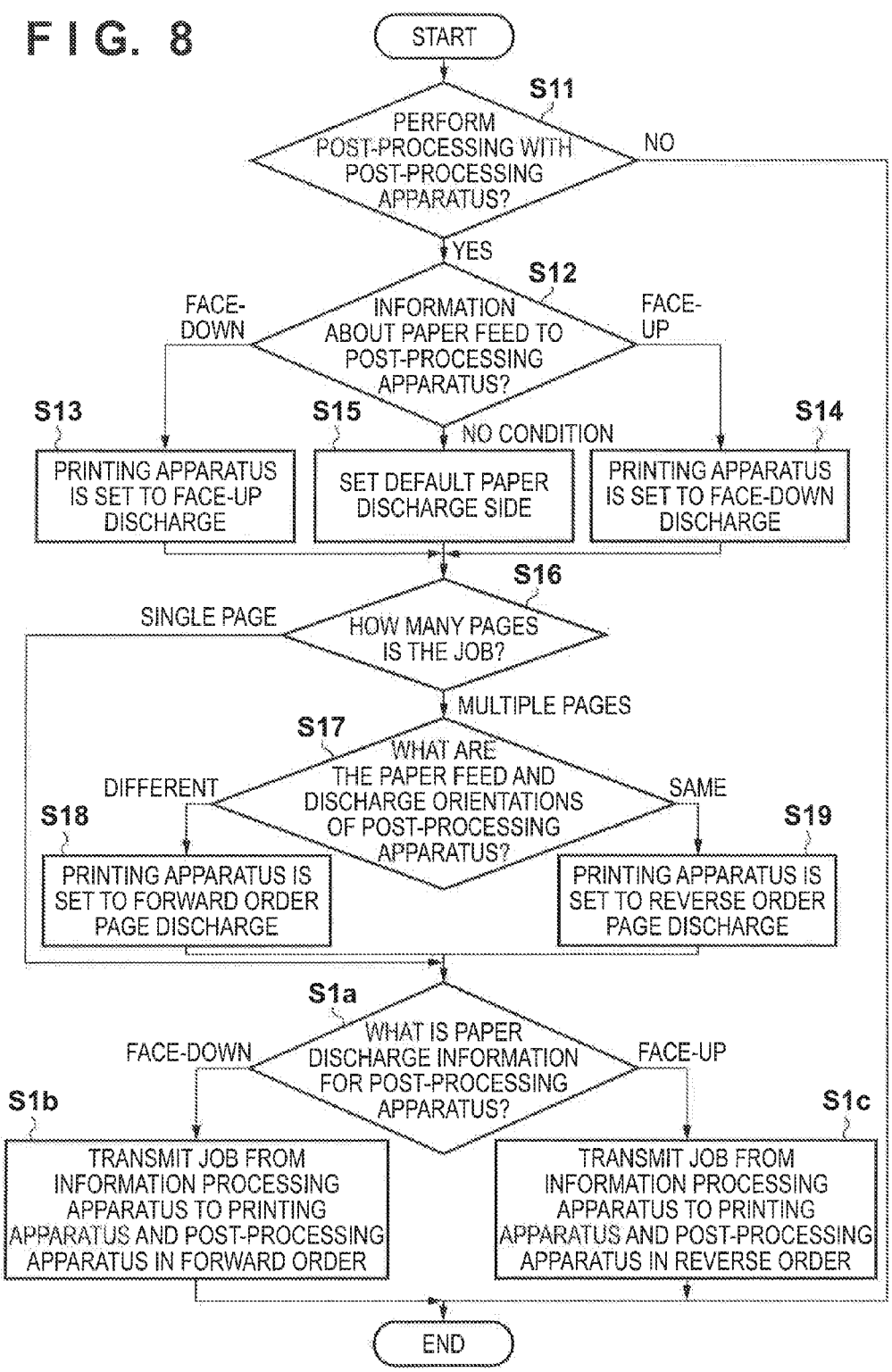

FIG. 9A

RECEIVED JOB ORDER

| | PAPER PRINTED WITH JOB 3 | FRONT<br>BACK |
|---|---|---|
| JOB 1<br>JOB 2<br>JOB 3 | PAPER PRINTED WITH JOB 2 | FRONT<br>BACK |
| | PAPER PRINTED WITH JOB 1 | FRONT<br>BACK |

RECEIVED JOB ORDER

| | PAPER PRINTED WITH JOB 1 | BACK<br>FRONT |
|---|---|---|
| JOB 1<br>JOB 2<br>JOB 3 | PAPER PRINTED WITH JOB 2 | BACK<br>FRONT |
| | PAPER PRINTED WITH JOB 3 | BACK<br>FRONT |

| PAPER PRINTED WITH JOB 3 | BACK<br>FRONT |
|---|---|
| PAPER PRINTED WITH JOB 2 | BACK<br>FRONT |
| PAPER PRINTED WITH JOB 1 | BACK<br>FRONT |

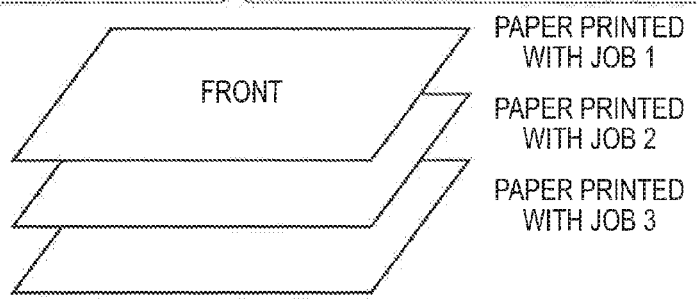

FIG. 11A

RECEIVED JOB ORDER

| JOB 3 |
| JOB 2 |
| JOB 1 |

PAPER PRINTED WITH JOB 1 — FRONT / BACK
PAPER PRINTED WITH JOB 2 — FRONT / BACK
PAPER PRINTED WITH JOB 3 — FRONT / BACK  1101

FIG. 11B

RECEIVED JOB ORDER

| JOB 3 |
| JOB 2 |
| JOB 1 |

PAPER PRINTED WITH JOB 3 — BACK / FRONT
PAPER PRINTED WITH JOB 2 — BACK / FRONT
PAPER PRINTED WITH JOB 1 — BACK / FRONT  1102

FIG. 11C

PAPER PRINTED WITH JOB 1 — BACK / FRONT
PAPER PRINTED WITH JOB 2 — BACK / FRONT
PAPER PRINTED WITH JOB 3 — BACK / FRONT  1103

FIG. 11D

RECEIVED JOB ORDER

| JOB 1 |
| JOB 2 |
| JOB 3 |

PAPER PRINTED WITH JOB 1 — BACK / FRONT
PAPER PRINTED WITH JOB 2 — BACK / FRONT
PAPER PRINTED WITH JOB 3 — BACK / FRONT  1103

FIG. 11E

PAPER PRINTED WITH JOB 3 — BACK / FRONT
PAPER PRINTED WITH JOB 2 — BACK / FRONT
PAPER PRINTED WITH JOB 1 — BACK / FRONT  1104

INFORMATION PROCESSING APPARATUS AND METHOD FOR CONTROLLING SAME

BACKGROUND OF THE INVENTION

1. Field of the Invention

The present invention relates to an information processing apparatus which controls the execution of jobs performed by a printing apparatus and by a post-processing apparatus that performs a post-processing step in which is used printed matter printed by the printing apparatus, and relates to a control method for controlling this information processing apparatus.

2. Description of the Related Art

There is what is known as a photobook order service, with which a user can order a book in which the user has laid out a number of pages on a personal computer and arranged image data as desired. This photobook is made up of a number of parts, such as the body, front cover, and book jacket, and since the post-processing performed after printing varies for each of these parts in the course of producing the photobook, the processing was done on separate post-processing apparatuses. Thus, the printing has to be done in part units, and that printed matter has to be fed directly to the post-processing apparatus and subjected to post-processing, so that sorting won't take as long in transporting the various parts of printed matter to the post-processing apparatus. Whether the front of the paper fed to the post-processing apparatus in this case is determined ahead of time by what kind of material is being produced, what kind of paper feed the post-processing apparatus is capable of, and so forth. Thus, it is necessary to control the side of the paper discharged at the printing stage so that the worker can collect the various parts of printed matter together and feed them efficiently into the post-processing apparatus.

Japanese Patent Laid-Open No. 2009-269310 is an example of a technique for controlling the side of the paper discharged in a printing job on the basis of the side of the paper fed to the post-processing apparatus. In Japanese Patent Laid-Open No. 2009-269310, whether the front of the paper discharged from the printing apparatus is decided on the basis of capability information indicating the paper feed method of the post-processing apparatus, the paper discharge information thus decided is sent to the post-processing apparatus, and paper discharge information is outputted as work instructions. Also, controlling so that these work instructions are discharged on the very top of the stacked printed matter makes it easier for the worker to obtain the work instructions.

With she prior art referred to above, however, if the post-processing is different for a plurality of parts in the production of a photobook, then even though the side of the paper feed to the post-processing apparatus is different from one part to the next, control of paper discharge cannot be switched far every part. Also, with prior art, the only thing controlled was whether the paper in a print job would be discharged face-down (with the front of the printed matter facing down) or face-up (with the front of the printed matter facing up).

However, when a single job consists of a plurality of pages, there is the possibility that when the pages are outputted from the post-processing apparatus, they will be in reverse order, so that the order goes from the last page to the first page. Also, a particular user generally does not order a large quantity of photobooks with the same content, and instead it is more common for different users to order small quantities of different books. Therefore, when photobooks are put together, the various printed parts are preferably arranged in the order of the various corresponding books, so that the first printed matter for each part is a part of book A, and the second printed matter is a part of book B. With the prior art discussed above, however, since the order is not controlled between the parts of the various books, a problem is that the parts corresponding to each book have to be looked for.

SUMMARY OF THE INVENTION

An aspect of the present invention is to eliminate the above-mentioned problems in the conventional technology.

A feature of this invention is to provide a technique for controlling the discharge of printed matter from a printing apparatus for different kinds of printing apparatus.

According to an aspect of the present invention, there is provided an information processing apparatus that controls execution of lobs performed by a printing apparatus and by a post-processing apparatus that performs a post-processing in which printed matters printed by the printing apparatus are used, the apparatus comprising: a storing unit configured to store post-processing step information including information about a post-processing apparatus used in a step of post-processing for a plurality of kinds of printed matter printed by the printing apparatus, and paper feed information indicating whether to feed paper face-up or face-down to the post-processing apparatus; a storage unit configured to store sheet feed/discharge information related to paper feed to the post-processing apparatus and paper discharge from the post-processing apparatus; an acquisition unit configured to acquire, on the basis of a plurality of jobs that designate the execution of printing with the printing apparatus and a post-processing with the post-processing apparatus, post-processing step information for the post-processing apparatus designated by the jobs, and sheet feed/discharge information related to paper feed to the post-processing apparatus and paper discharge from the post-processing apparatus; a determination unit configured to determine, on the basis of the post-processing step information and the sheet feed/discharge information, whether to put the front of the printed matter discharged from the printing apparatus face-up or face-down with respect to each of a plurality of types of printed matter, and the order in which the jobs are to be executed in the post-processing; an edit unit configured to edit the plurality of jobs on the basis of the execution order and whether the front of the printed matter discharged from the printing apparatus is face-up or face-down as determined by the determination unit; and a transmission unit configured to transmit the plurality of jobs edited by the edit unit to the printing apparatus and the post-processing apparatus.

According to an aspect of the present invention, there is provided a control method for controlling an information processing apparatus, which controls the execution of jobs performed by a printing apparatus and by a post-processing apparatus that performs a post-processing in which printed matters printed by the printing apparatus are used, the method comprising: a storing step of storing post-processing step information including information about a post-processing apparatus used in a step of post-processing for a plurality of kinds of printed matter printed by the printing apparatus, and paper feed information indicating whether to feed paper face-up or face-down to the post-processing apparatus; a storage step of storing sheet feed/discharge information related to paper feed to the post-processing apparatus and paper discharge from the post-processing apparatus; an acquisition step of acquiring, on the basis of a plurality of jobs that designate the execution of printing with the printing apparatus and a post-processing with the post-processing apparatus, post-processing step information for the post-processing apparatus designated by the jobs, and sheet feed/discharge information related to paper feed to the post-processing apparatus and paper discharge from the post-processing apparatus; a determination step of determining, on the basis of the post-processing step information and the sheet feed/discharge information, whether to put the front of the printed matter discharged from the printing apparatus face-up or face-down with respect to each of a plurality of types of printed matter, and the order in which the jobs are to be executed in the post-processing; an edit step of editing the plurality of jobs on the basis of the execution order and whether the front of the printed matter discharged from the printing apparatus is face-up or face-down as determined in the determination step; and a transmission step of transmitting the plurality of jobs edited in the edit step to the printing apparatus and the post-processing apparatus.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a view illustrating an example of the configuration of a job in which photobook production processing is executed.

FIG. 5 depicts a view illustrating a table giving an example of the configuration of post-processing step information, which is managed by a work flow manager of the information processing apparatus.

FIG. 8 is a flowchart for describing processing for deciding the paper discharge side of printed matter, the page order, and the job transmission order with an information processing apparatus according to a first embodiment.

FIGS. 9A to 9D depict views illustrating examples of control up to the decision as to the paper discharge side of a print job, the page order, and the job transmission order in the first embodiment.

FIGS. 11A to 11E depict views illustrating examples of control up to the decision as to the paper discharge side of a print job, the page order, and the job transmission order in the second embodiment.

DESCRIPTION OF THE EMBODIMENTS

Embodiments of the present invention are described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
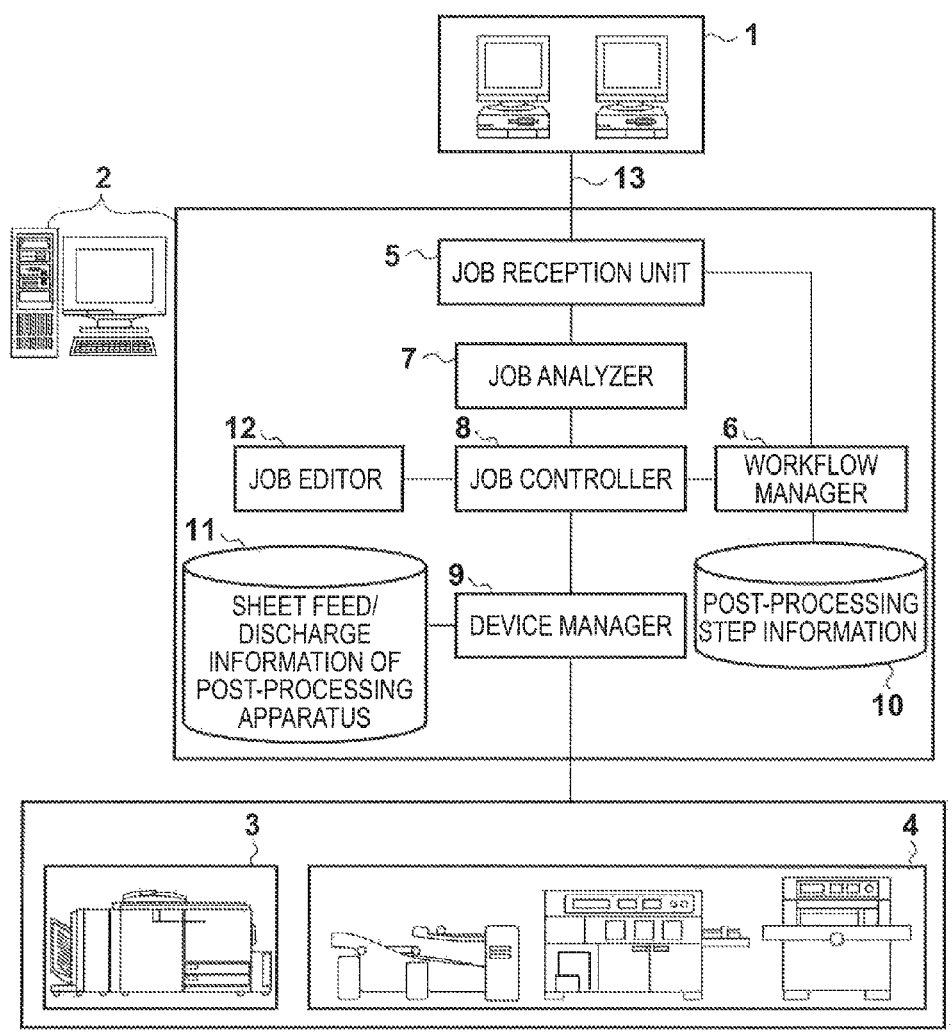
FIG. 1 is a block diagram of an example of the configuration of a photobook production system according to an embodiment.

FIG. 1 is a block diagram of an example of the configuration of a photobook production system according to the embodiment.

This system mainly comprises a client device 1, an information processing apparatus 2, a printing apparatus 3, and a post-processing apparatus 4. The client device 1 is used by the user mainly to edit and produce the layout of the photobook. Once the user of the client device 1 has finished editing the layout of the photobook and confirmed his order, the client device 1 produces a plurality of jobs related to the photobook produced by the user. The term "job" referred to here means content information processed by the printing apparatus 3 and the post-processing apparatus 4, or to a job ticket, or to a combination of the two. With this system, we shall assume that there are one or more client devices 1. Also, the client device 1 is connected by a network 13 to the information processing apparatus 2, and communicates via the Internet, etc. The information processing apparatus 2 accepts jobs from the client device 1, and controls output to the printing apparatus 3 and the post-processing apparatus 4.

The information processing apparatus 2 has a job reception unit 5, a workflow manager 6, a job analyzer 7, a job controller 8, a device manager 9, post-processing step information 10, sheet feed/discharge information 11, and a job editor 12. The printing apparatus 3 interprets a print job that has been transmitted in, and performs rasterization and printing. The post-processing apparatus 4 interprets a post-processing job that has been transmitted from the device manager 9, automatically sets post-Processing parameters, and performs post-processing of printed matter at the timing set for the printed matter printed by the printing apparatus 3. Examples of types of this post-processing apparatus 4 include a case binding device, a sheet cutting device, a creasing machine, and a laminating machine.

Figures 6, 7:
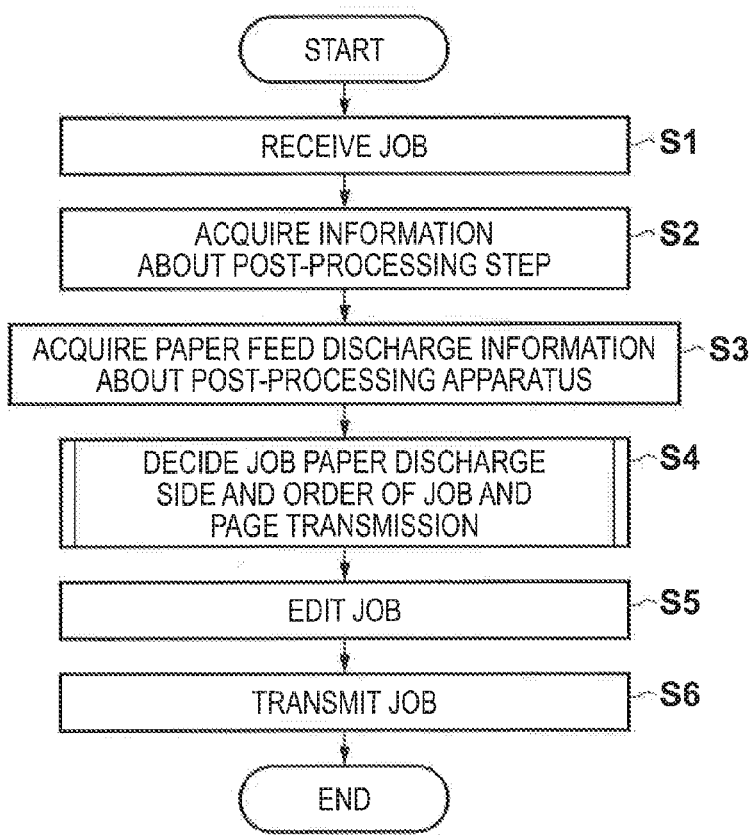
FIG. 6 depicts a view illustrating a table giving an example of the configuration of sheet feed/discharge information, which is managed by a device manager of the information processing apparatus.
FIG. 7 is a flowchart for describing the transmission control processing in a job performed by the information processing apparatus.

The job reception unit 5 accepts data about a print job or a post-processing job from the client device 1. The workflow manager 6 manages data related to the work flow of post-processing preset by the user. Data received by the job reception unit 5 is stored and managed as the post-processing step information 10 under the control of the workflow manager 6. The job analyzer 7 analyzes a job received by the job reception unit 5, and acquires detailed information about the content or detailed print setting information. The job analyzer 7 also performs job analysis, and stores information about print settings or information about post-processing settings with respect to the content information in a memory (such as the hard disk 23 in FIG. 2). The job controller 8 controls a job analyzed by the job analyzer 7 so that the job is outputted on the basis of the post-processing step information 10 managed by the workflow manager 6, or the sheet feed/discharge information 11 of the post-processing apparatus 4. The device manager 9 manages the printing apparatus 3 and the post-processing apparatus 4. The device manager 9 has the function of acquiring capability information, configuration information, and printer connection information from the printing apparatus 3 and the post-processing apparatus 4, as well as the function of transmitting print jobs to the printing apparatus 3 and post-processing jobs to the post-processing apparatus 4. Also, the information processing apparatus 2 holds the post-processing step information 10 and the sheet feed/discharge information 11 of the post-processing apparatus 4. Details of the post-processing step information 10 are shown in FIG. 5, and those of the sheet feed/discharge information 11 of the post-processing apparatus are shown in FIG. 6. The job editor 12 has the function of editing job tickets or the content of jobs.

Figure 2:
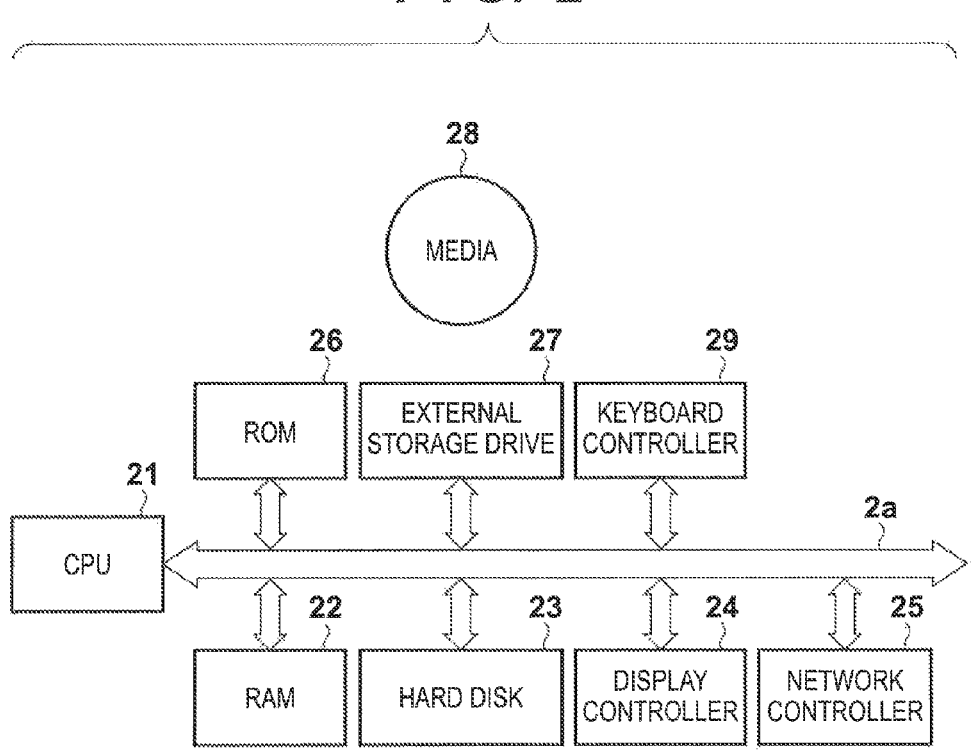
FIG. 2 is a block diagram of an example of the hardware configuration of an information processing apparatus.

FIG. 2 is a block diagram of an example of the hardware configuration of the information processing apparatus 2 according to the embodiment.

A CPU 21 executes programs stored in the program area of a ROM 26, or programs such as general-purpose applications and operating systems loaded from the hard disk drive 23 to a RAM 22. The RAM 22 functions as the main memory, work area, etc., for the CPU 21. The hard disk drive 23 stores operating systems, general-purpose applications, and other such programs, photo data, user files, electronic copy files, and so forth. Print jobs received by the information processing apparatus 2 are all stored on the hard disk drive 23. The hard disk drive 23 also stores the above-mentioned post-processing step information 10, sheet feed/discharge information 11, and so forth. A display controller 24 controls the display of a display component (not shown). A network controller 25 executes communication control processing with other devices connected to the network 13. A keyboard controller 29 controls input from a keyboard or pointing device. An external storage drive 27 controls writing to a CD, DVD, or other such media 28. The CPU 21 is also connected to the various units by an internal bus 2a, and, controls the operation of these.

Figure 3A:
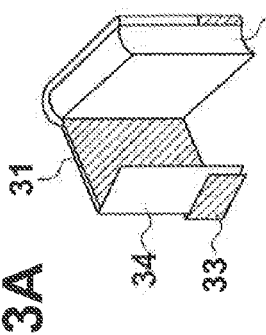
FIG. 3A depicts a view illustrating the configuration of a photobook.
Figure 3B:
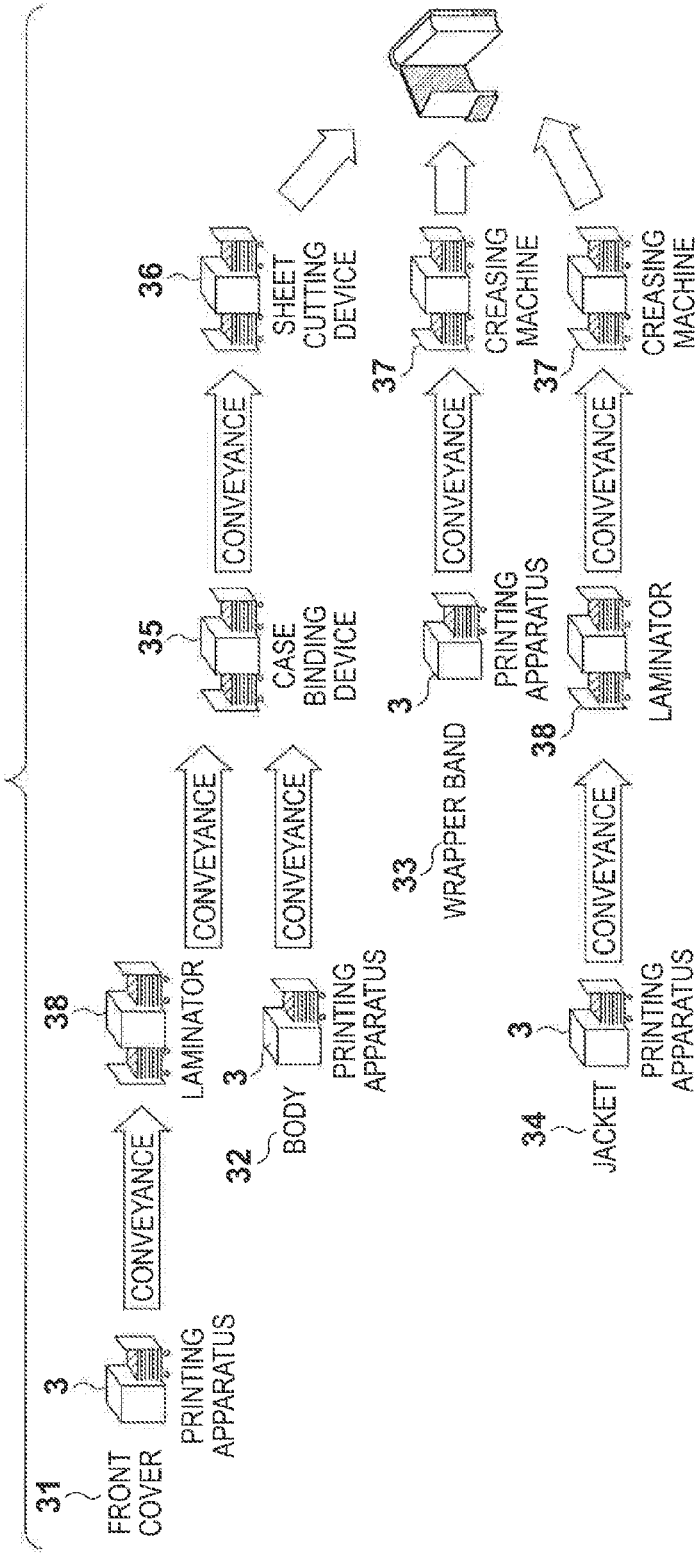
FIG. 3B depicts a view illustrating an example of the processing steps up to photobook production.

FIG. 3A shows the configuration of a photobook according to this embodiment, and FIG. 3B shows an example of the processing steps up to photobook production.

FIG. 3A shows an example of the configuration of a photobook, and in this embodiment a single photobook is produced by putting together four different parts: a front cover 31, a body 32, a wrapper band 33, and a jacket 34. The front cover 31 and the body 32 are bound by case binding, this product is covered with the jacket 34, and the wrapper band 33 is placed over this.

FIG. 3B shows an example of the processing steps for the various parts up to photobook production. The various parts are printed by the printing apparatus 3, the printed matter is conveyed manually to the post-processing apparatus 4, and post-processing is performed at the post-processing apparatus 4. The post-processing of the front cover 31 involves lamination to the surface by a laminator 38, after which the product is conveyed to a case binding device 35. The front cover 31 and the body 32 are case bound by the case binding device 35, which produces a single book. In this case binding, the printed matter for the front cover 31 and the body 32 are manually conveyed to the case binding device 35 and placed at separate locations of the case binding device 35. Also, setting information for post-processing that has been transmitted to the post-processing apparatus 4 ahead of time is read as a barcode printed on the front cover 31 or the body 32, so this setting information is reflected in the case binding device 35. After this case binding, the book is trimmed by a sheet cutting device 36.

Meanwhile, the wrapper band 33 is printed by the printing apparatus 3, after which it is creased and trimmed by a creasing machine 37. The jacket 34 is then printed by the printing apparatus 3 and laminated to the surface by the laminator 38, after which it is creased and trimmed by the creasing machine 37. Finally, the parts are put together to complete a single photobook.

As discussed above, the procedure for the various parts is the same in terms of the print processing performed by the printing apparatus 3 at the outset, but in the post-processing that follows, the number of post-processing apparatuses used and the procedure involved are different. The devices that are shared by the various parts, such as the printing apparatus 3, may be the same device, or separate devices may be used. Also, as long as the order of the steps is preserved, a plurality of steps may be performed by the same device. For instance, in the step of the jacket 34, the lamination performed by the laminator 38 and the creasing performed by the creasing machine 37 are performed by separate devices, but a single device capable of performing lamination and creasing in the proper order may be used.

FIG. 4 shows an example of the configuration of a job in which the photobook production processing according to the embodiment is executed.

In this example, when an order is received from a user, the client device 1 produces content and a job ticket according to the order. In this example, there are a total of eight jobs produced under an order to produce one photobook: print jobs 41 to 44 in which the various parts are printed, a case binding job 45, a sheet cutting job 46, and wrapper band and jacket creasing jobs 47 and 48. Of these, since the print jobs 41 to 44 are jobs related to printing, they include print and content settings for the various parts. On the other hand, the jobs other than print jobs are related to post-processing, so only post-processing settings are included.

The device manager 9 of the information processing apparatus 2 transmits these eight jobs to devices capable of executing the jobs. After the jobs have thus been transmitted, printing can be performed at the printing apparatus 3. At the post-processing apparatus 4, printed matter printed by the printing apparatus 3 is conveyed by a worker to the post-processing apparatus 4, and the post-processing setting parameters transmitted from the information processing apparatus 2 are called up and post-processing of the printed matter can be performed.

FIG. 5 depicts a view illustrating a table giving an example of the configuration of the post-processing step information 10, which is managed by the work flow manager 6 of the information processing apparatus 2.

The post-processing step information 10 is information for managing, by part, the work flow related to post-processing, the page configuration, and the paper feed in each step, and is stored here in table format as shown in FIG. 5. The post-processing step information 10 has four categories: the part names 51, the names 52 of the post-processing apparatus used in each post-processing step (post-processing apparatus names), paper feed information 53 indicating whether the paper is fed face-up or face-down to the post-processing apparatus, and the page configuration 54. The part names 51 are the names used to uniquely identify the parts of the photobook dealt with in the work flow. In this example, four types are dealt with, namely, the front cover, the body, the wrapper band, and the jacket, so these names are listed in the table. The post-processing apparatus names 52 are the names used to uniquely identify the post-processing apparatus 4 used in each post-processing step for the job represented by the part name 51. It is necessary that this name corresponds to the name of the post-processing apparatus of the sheet feed/discharge information 11 of the post-processing apparatus illustrated in FIG. 6. The paper feed information 53 indicates the paper feed when the post-processing apparatus 4 indicated by the post-processing apparatus name 52 is used to perform post-processing for the jobs corresponding to the part name 51. This paper feed information 53 can be "face-up paper feed," "face-down paper feed," or both of these. Here, "face-up paper feed" means that the paper is fed in a state in which the front of the printed matter is facing up, and "face-down paper feed" means that the paper is fed in a state in which the front of the printed matter is facing down. For example, in a job in which the part name 51 is "front cover," the post-processing apparatus name 52 indicates that the paper should be fed face-down in the post-processing of the laminator 38.

The post-processing apparatus names 52 and the paper feed information 53 comprise a plurality of categories when a plurality of post-processing apparatuses 4 are used in the post-processing steps of a job corresponding to the part name 51. For instance, in this embodiment, as shown in FIG. 3B, the post-processing steps of a "front cover" job make use of three post-processing apparatuses 4, such as the laminator 38, the case binding device 35 and the sheet cutting device 36, so there are a total of three settings for the post-processing apparatus names 52 and the paper feed information 53. The page configuration 54 indicates what the page configuration is in the job represented by the part name 51. The page configuration 54 is set to "single page" when the number of sheets to be discharged is one, and is set to "multiple pages" when the number of sheets to be discharged is more than one. In this embodiment, the front cover, the wrapper band, and the jacket are each set to "single page" since only one sheet of printed matter is discharged. The "body" is set to "multiple pages" since a plurality of sheets of printed matter are discharged, and the other parts are all set to "single page" since they consist of one page.

FIG. 6 depicts a view illustrating a table giving an example of the configuration of the sheet feed/discharge information 11 of the post-processing apparatus 4, which is managed by the device manager 9 of the information processing apparatus 2.

The sheet feed/discharge information 11 of the post-processing apparatus is information for managing the capability of the post-processing apparatus 4 to feed and discharge paper, is managed in table form as shown in FIG. 6, and has post-processing apparatus names 61, paper feed information 62, and paper discharge information 63. The post-processing apparatus names 61 represent the names used to identify she post-processing apparatus 4 currently managed by the work flow of this system. The paper feed information 62 is information about the capability of the post-processing apparatus set by the post-processing apparatus name 61 so feed paper. This paper feed information 62 can be "face-up paper feed," "face-down paper feed," or both of these. The paper discharge information 63 is information about the capability of the post-processing apparatus set by the post-processing apparatus name 61 to discharge paper. The paper discharge information 63 is set to "same orientation as paper feed," "different orientation from paper feed," both of these, or "none," depending on the relation between the direction of the printed matter during paper feed and the direction of the printed matter during paper discharge. The sheet feed/discharge information 11 of the post-processing apparatus 4 may be acquired and varied by the device manager 9 by acquiring capability information from the post-processing apparatus 4, or may be set by a worker.

The setting of the printed matter front (paper discharge side), that is, whether it is face-up or face-down, after printing by the printing apparatus 3, and the setting of the transmission order of pages and jobs are controlled by the sheet feed/discharge information 11 of the post-processing apparatus described above, and by the post-processing step information 10 described through reference to FIG. 5.

First Embodiment

Next, an example of transmission control processing in a job performed by the information processing apparatus 2 according to the first embodiment of the present invention will be described through reference to the flowchart shown in FIG. 7. The program that executes this processing is stored on the hard disk 23 of the information processing apparatus 2, developed in the RAM 22 during execution, and executed under the control of the CPU 21.

First, in step S1, the job reception unit 5 receives jobs produced by the client device 1. These received jobs shall be described through reference to FIG. 4. These jobs are received in a number equal to the number of types of photobook ordered by the user. Also, the job analyzer 7 analyzes what kind of job the received jobs are, and what the settings are for these jobs, and stores these results in the RAM 22. The flow then proceeds to step S2, and the job controller 8 acquires the post-processing step information 10 described through reference to FIG. 5, which is managed by the workflow manager 6.

The flow then proceeds to step S3, in which the job controller 8 acquires the sheet feed/discharge information 11 for the post-processing apparatus described through reference to FIG. 6. The acquisition of the sheet feed/discharge information 11 for the post-processing apparatus in step S3, as discussed above, may be directly from the post-processing apparatus 4 by the job controller 8 via the device manager 9, or capability information related to the paper feed and discharge of the post-processing apparatus 4 and set by the user may be acquired. The flow then proceeds to step S4, in which the job controller 8 decides on the setting for the front (discharge side) of the paper printed and discharged in the print job, the set order of page transmission, and the job transmission order, on the basis of the post-processing step information 10 acquired in step S2 and the sheet feed/discharge information 11 for the particular acquired in step S3. The processing in step S4 will be described in detail through reference to the flowchart in FIG. 8. Once the job settings and transmission order have thus been decided, the flow proceeds to step S5, in which the job editor 12 edits content and print settings on the basis of the transmitted page order setting or the setting for the paper discharge side in the print job decided in step S4. Finally, in step S6, the device manager 9 transmits the job edited in step S5 to the printing apparatus 3 or the post-processing apparatus 4 on the basis of the transmission order decided in step S4. When the processing in step S6 is finished, this processing is ended.

Next, an example of processing to decide the print job paper discharge side, the page order, and the job transmission order, which is performed by the job controller 8, when a single post-processing apparatus is used in the first embodiment, will be described through reference to the flowchart in FIG. 8.

FIG. 8 as a flowchart for describing processing for deciding the paper discharge side of printed matter, the page order, and the job transmission order with the information processing apparatus 2 according to the first embodiment, and illustrates the processing executed by the job controller 8 to decide the paper discharge side, the page order, and the transmission order. The program that executes this processing is stored on the hard disk 23 of the information processing apparatus 2, developed in the RAM 22 during execution, and executed under the control of the CPU 21.

First, in step S11, the job controller 8 identifies which part the job belongs to, on the basis of the attributes of the job to be processed, and determines whether or not the part is to undergo post-processing in the post-processing apparatus. If it is determined that the part will not undergo post-processing, this processing is ended.

If post-processing is to be performed, the flow proceeds to step S12, and the processing in steps S12 to S15 here indicates processing to decide whether the front of the paper will be up or down when the printed matter is discharged from the printing apparatus 3 that executes the print job. In step S12, the job controller 8 determines whether or not the front of the paper feed to the post-processing apparatus 4 used by the part in question is to face up, on the basis of the sheet feed/discharge information 11 of the post-processing apparatus. If the paper feed of the post-processing apparatus 4 is "face-down feed," the flow proceeds to step S13, and the setting for the front of the printed matter discharged by the print job is set to "face-up discharge." On the other hand, if the paper feed of the post-processing apparatus is "face-up feed," the flow proceeds to step S14, and the setting for the front of the printed matter discharged by the print job is set to "face-down discharge." This setting is performed so that the order in which jobs are executed by the printing apparatus will be the same as the order in which jobs are executed by the post-processing apparatus. If there are no conditions on the paper feed information of the post-processing apparatus 4, the flow proceeds to step S15, and the default paper discharge side is set. This processing will be described in detail through reference to FIG. 9.

Then, from step S16 to step S19, processing to decide the page order is indicated. First, in step S16, the number of pages of the job is acquired, and it is determined whether the number of pages is single one sheet) or multiple. If the job comprises a single page, there is no need to set the page transmission order, so the flow proceeds to step S1*a* without performing any processing to decide the page transmission order. On the other hand, if the job comprises multiple pages, the flow proceeds to step S17, and paper feed information and paper discharge information for the post-processing apparatus to which the job is related are acquired. It is then determined whether the paper feed and discharge of the post-processing apparatus have the same or different orientations. If the paper feed and discharge have different orientations, the flow proceeds to step S18, and a setting is made so that the pages will be discharged in the forward order. The reason for discharging the papers in the forward order is that a mechanical characteristic of the post-processing apparatus is to execute starting from the uppermost sheet of paper, so if the paper feed and discharge have different orientations (face-up feed and face-down discharge), the page order for each job will be maintained, without being inverted, during execution by the post-processing apparatus. Here, "discharge in forward order" means that when the front of the printed matter is placed facing up, it is discharged and stacked in the order of page 1, page 2, and so on, starting from the top, and the front of the printed matter at the very bottom is the last page. On the other hand, if the paper feed and discharge have the same orientation, the flow proceeds to step S19, and a setting is made so that the pages are discharged in reverse order. The reason for discharging the pages in reverse order is that due to the above-mentioned mechanical characteristic of the post-processing apparatus, if the paper feed and discharge have the same orientation (face-up feed and face-up discharge), the order of pages for each job will end up being reversed during execution at the post-processing apparatus. Here, "discharge in reverse order" means that when the front of the printed matter is placed facing up, it is discharged and stacked in the order of the last page, the next-to-last page, and so on, starting from the top, and the printed matter at the very bottom becomes page 1.

Then, from step S1*a* to step S1*c*, processing to decide the job transmission order is indicated. First, in step S1*a*, the job controller 8 determines what the paper discharge is for the post-processing apparatus, on the basis of the sheet feed/discharge information 11 of the post-processing apparatus. If the paper discharge is "face-down discharge," the flow proceeds to step S1*b*, and a decision is made to make a setting so that jobs are transmitted in forward order from the information processing apparatus 2 to the printing apparatus 3 and the post-processing apparatus 4. The information processing apparatus 2 transmits in an order based on a certain rule when transmitting jobs to the printing apparatus 3 and the post-processing apparatus 4. Examples of this rule include starting with jobs having the earliest production date and time, and going in the order of job names. Transmitting jobs in forward order means that the jobs are transmitted in an order based on a certain rule. Conversely, if the paper discharge of the post-processing apparatus is "face-up discharge," the flow proceeds to step S1*c*, and a decision is made to make a setting so that jobs are transmitted in reverse order from the information processing apparatus 2 to the printing apparatus 3 and the post-processing apparatus 4. Here, transmitting jobs in reverse order means that they are transmitted in an order that is opposite the order based on the certain rule. If the paper is discharged face-down from the post-processing apparatus, the first job in the certain rule order is discharged at the very bottom. Thus, the job order should be such that that job is performed first, that is, the jobs are processed in forward order, so the jobs are transmitted in forward order. Conversely, if the paper is discharged face-up, the last job in the certain rule order will be discharged at the very top. Thus, the job order should be such that the first job is performed last, that is, the jobs are processed in reverse order.

The control performed up to the processing to decide the print job paper discharge side, the page order, and the job transmission order related to the wrapper band 33 according to the first embodiment will be described along with the flowchart in FIG. 8, through reference to FIGS. 9A to 9D.

First, in step S11, a post-processing step is included in the post-processing step information 10, so the flow proceeds to step S12. In steps S12 to S15, the orientation is decided for the paper discharge side when the printed matter is discharged from the printing apparatus 3. The paper feed of the creasing machine 37 can be either "face-up feed" or "face-down feed," because of the sheet feed/discharge information 11 for the post-processing apparatus in FIG. 6. However, with the post-processing step information 10 in FIG. 5, it is necessary to perform "face-down feed" with the creasing machine 37 in a wrapper hand job. Furthermore, since the paper discharge of the creasing machine 37 is "same orientation as paper feed" (FIG. 6), in this case the result is "face-down discharge." Thus, in step S12, paper feed to the post-processing apparatus (the creasing machine 37) is "face-down feed," the flow proceeds to step S13, and the paper discharge of the printing apparatus 3 is decided to be "face-up discharge."

FIG. 9A depicts a side view of printed matters (papers) discharged from the printing apparatus 3. We will assume that the job controller 8 processes the jobs in the order of job 1, job 2, and job 3. Since the printing apparatus 3 here performs "face-up discharge," the front of each printed matter that is discharged is facing up. Also, since the paper is discharged starting with job 1, the printed matter printed with the content of job 1 is discharged at the very bottom on a paper discharge tray 900, and the printed matter printed with the content of job 3 is discharged at the very top.

Next, in step S16, the page order for each job is decided. The page configuration 54 of the post-processing step information 10 in FIG. 5 indicates that the wrapper band job is a single page, so the flow proceeds from step S16 to step S1a. In step S1a the transmission order of jobs to the creasing machine 37 is decided. Based on the sheet feed/discharge information 11 of the post-processing apparatus in FIG. 6, paper discharge information 63 for the creasing machine 37 is "same orientation as paper feed," that is, it is "face-down discharge," so the flow proceeds to step S1b, and the jobs are transmitted in forward order from the information processing apparatus 2 to the post-processing apparatus 4.

FIG. 9B depicts a side view of printed matters after paper feed at the creasing machine 37. Since the wrapper band job is fed face-down, the stack of printed matters discharged in FIG. 9A is fed in a state in which the back side is facing up. Specifically, the operator turns over the entire stack of printed matters shown in FIG. 9A and places it in the creasing machine 37. Consequently, the printed matter of job 1 is placed at the very top of a paper feed tray 901, and the printed matter of job 3 is placed at the very bottom. Also, since the jobs are transmitted in forward order from the information processing apparatus 2 to the post-processing apparatus 4, the processing is performed starting with the printed matter of job 1. The order in which the post-processing apparatus 4 subjects the printed matter to post-processing is generally such that it starts from the printed matter at the top, for mechanical reasons. Thus, the order of jobs transmitted to the printing apparatus 3 coincides with the order of jobs fed to the creasing machine 37.

Next, FIG. 9C depicts a side view of printed matters discharged from the creasing machine 37. The creasing machine 37 discharges paper in the same orientation as during paper feed (which is face-down here), so the paper is discharged in a state in which the back side is facing up. Also, since the post-processing is executed starting from the printed matter of job 1, the printed matter of job 1 is discharged at the very bottom on a discharge tray 902, and is discharged in a state in which the printed matter of job 3 is located at the very top. The discharged stack of printed matters of the wrapper band 33 is flipped over so that the front faces up, as shown in FIG. 9D. In a state in which the front has thus been turned to face up, the printed matter is arranged in the order of the printed matter of job 1, the printed matter of job 2, and the printed matter of job 3, starting from the top, so it is not necessary to go to the trouble of rearranging the printed matter when it is combined with other parts, etc.

Figure 14A:
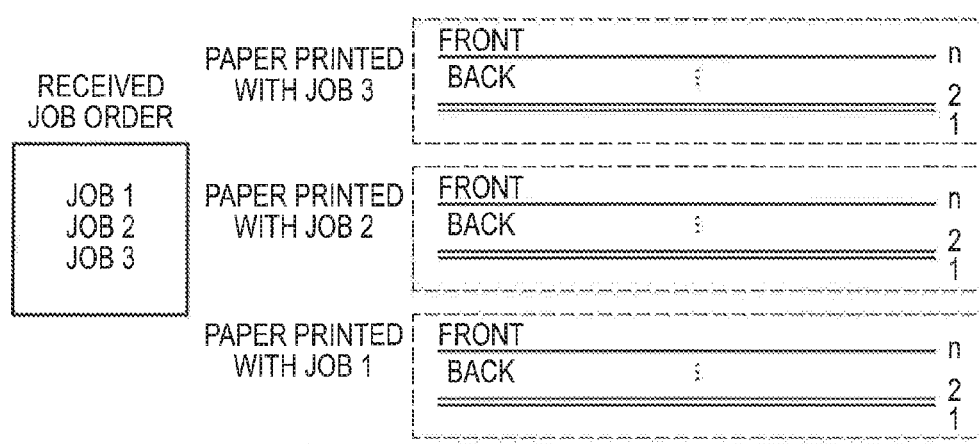
FIGS. 14A to 14D depicts a view illustrating the results of applying the first embodiment when a wrapper band job consists of a plurality of pages.

Next, the results of applying the first embodiment to when the wrapper band job consists of a plurality of pages will be described through reference to FIGS. 14A to 14D. FIG. 14A depicts a side view of printed matters (papers) discharged from the printing apparatus 3. FIG. 14A shows a state in which jobs 1 to 3 have been executed in order, and the printed matter for each job has been discharged face-up. First, the discharge side is decided in step S12 in FIG. 8. It can be seen in FIGS. 5 and 6 that it is necessary for the creasing machine 37, which is the post-processing apparatus 4 used for the wrapper band, to perform "face-down paper feed." Thus, the flow proceeds to step S13, and the printing apparatus 3 performs "face-up paper discharge." Accordingly, as shown in FIG. 14A, the front of the discharged printed matter faces upward. The page order of each job is decided in steps S16 and S17 in FIG. 8. In this case, since there are a plurality of pages for the wrapper band job, the flow proceeds from step S16 to S17. In step S17, based on the sheet feed/discharge information 11 for the post-processing apparatus in FIG. 6, the paper feed and discharge of the creasing machine 37 have the same orientation, so in step S19 the printing apparatus 3 performs paper discharge in the reverse order. Thus, in each job the first page is discharged at the very bottom, and the last page (the n-th page in this case) is discharged at the top. Furthermore, the transmission order of the jobs is decided in step S1a in FIG. 8. In this case, the paper discharge information 63 of the creasing machine 37 is "same orientation as paper feed," that is, "face-down discharge," so the flow proceeds to step S1b, and transmission to the printing apparatus 3 and the post-processing apparatus 4 is performed in the forward order. Accordingly, printed matter on which the content of job 1 has been printed is discharged at the very bottom on the paper discharge tray, and printed matter on which the content of job 3 has been printed is discharged at the very top (FIG. 14A).

Figure 14B:
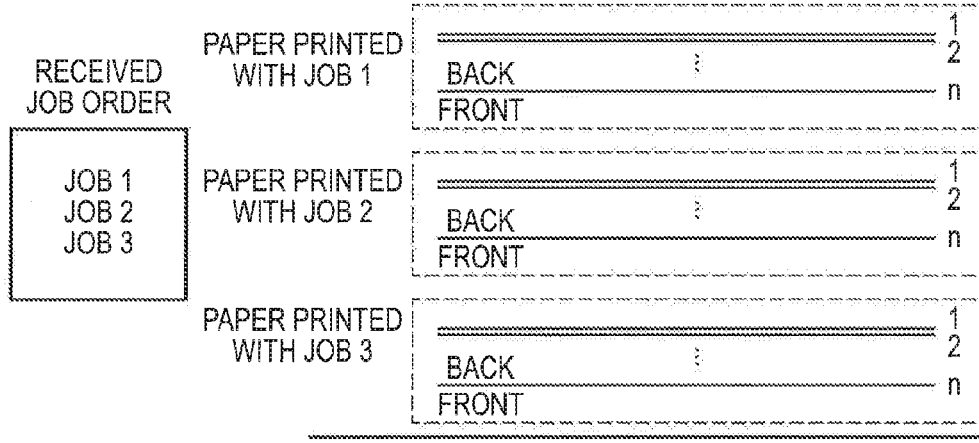

FIG. 14B depicts a side view of printed matters stacked on the paper feed tray of the creasing machine 37. Since it is necessary that the wrapper band job is fed face-down, the stack of printed matters discharged in FIG. 14A is turned over and placed in a state in which the back side is facing upward. Thus, the printed matter of job 1 is placed at the very top on the paper feed tray, and the printed matter of job 3 is placed at the very bottom. For the same reason, the first page in each job is placed at the very top, and the last page is placed at the very bottom. Furthermore, since the jobs are transmitted from the information processing apparatus 2 to the post-processing apparatus 4 in the forward order, that is, in the order of job 1, job 2, and job 3, processing is performed in order starting with the printed matter of job 1. Although mentioned above as well, the order in which the post-processing apparatus 4 performs post-processing of the printed matter is generally such that it starts from the printed matter at the top, for mechanical reasons. Thus, the order of jobs transmitted to the printing apparatus 3 coincides with the order of jobs fed to the creasing machine 37.

Figure 14C:
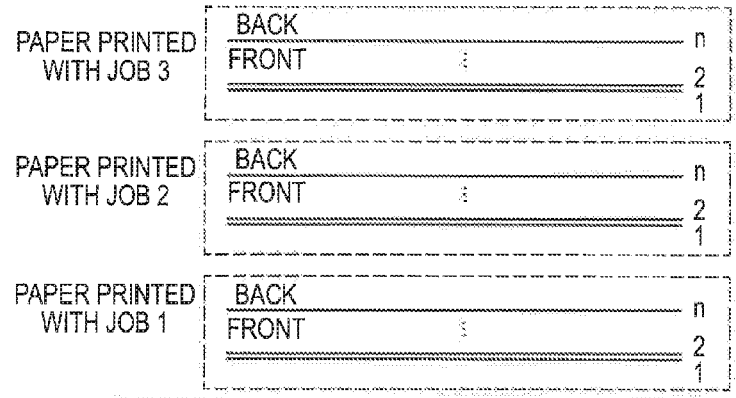
Figure 14D:
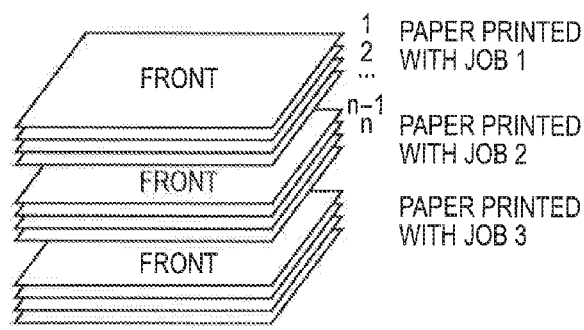

FIG. 14C depicts a side view of printed matters discharged on the discharge tray of the creasing machine 37. Since the creasing machine 37 discharges paper in the same orientation as it feeds paper, the paper is discharged face-down. Also, since each job is executed in order starting from the first page, the first page is discharged at the very bottom, and the last page is discharged at the very top. Furthermore, since post-processing is executed in order starting from the printed matter of job 1, the printed matter of job 1 is discharged at the very bottom on the paper discharge tray, and the printed matter of job 3 is discharged in a state of being located at the very top. The stack of printed matter for the wrapper band 33 thus discharged is turned over so that the front is facing upward as in FIG. 14D. In a state in which the front is thus facing upward, the printed matters are arranged in the order of the printed matter of job 1, the printed matter of job 2, and the printed matter of job 3, starting from the top. The pages in each job are arranged in the order of page 1, page 2, . . . , page n, starting from the top. Consequently, even though a single job consists of a plurality of pages, since the printed matter is arranged by page number and in job order when the front is facing upward, it is not necessary to go to the trouble of rearranging the printed matters when they are combined with other parts, etc.

With the first embodiment described above, when producing a photobook made up of a plurality of kinds of part, the discharge side of the printed matter from the printing apparatus 3, the page discharge order, and the job transmission order are controlled on the basis of information about the paper feed and discharge capability of the post-processing apparatus or the post-processing step information 10. This eliminates the need to rearrange the printed matters during paper feed to the post-processing apparatus for every part. Also, the final products for the various parts can be put in the proper order by performing the above-mentioned processing for each part. This allows the parts to be put together without having to rearrange the job or page order, so the working efficiency of the worker can be improved.

Second Embodiment

A second embodiment of the present invention will now be described. In this second embodiment, the processing performed by the job controller 8 when there are a plurality of post-processing apparatuses 4 used in the post-processing step will be described. The system configuration (FIG. 1) according to the second embodiment and the hardware configuration of the information processing apparatus are the same as in the first embodiment given above, and therefore will not be described again.

Figure 10:
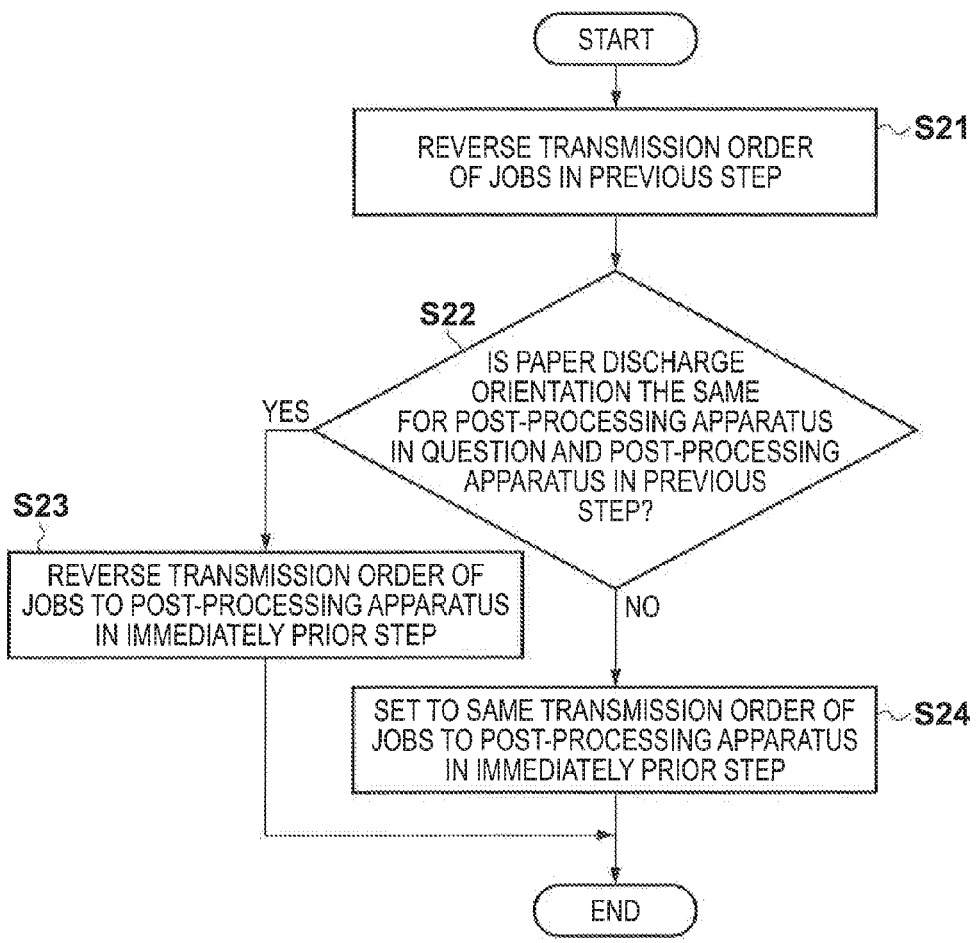
FIG. 10 is a flowchart for describing an example of transmission control processing in a job performed by the information processing apparatus according to a second embodiment.

FIG. 10 is a flowchart for describing an example of transmission control processing in job performed by the information processing apparatus 2 according to the second embodiment. The program that executes this processing is stored on the hard disk 23 of the information processing apparatus 2, developed in the RAM 22 during execution, and executed under the control of the CPU 21.

If a plurality of post-processing apparatuses 4 are being used, first, the processing described with the flowchart shown in FIG. 8 is applied at the post-processing apparatus 4 used first. After that, the paper discharge side and the page and job transmission orders are decided again by applying the flowchart in FIG. 10 at the second and subsequent post-processing apparatuses 4.

First, in step S21, the job controller 8 reverses the transmission order of jobs transmitted to the post-processing apparatus 4 in the previous step. Specifically, if the job transmission order has been set to forward order, it is changed to reverse order, and if it has been set to reverse order, it is changed to forward order. Then, the flow proceeds to step S22, and it is determined whether or not the post-processing apparatus 4 in question has the same paper discharge orientation as the post-processing apparatus 4 used in the immediately prior step. If it is determined that they are the same, the flow proceeds to step S23, and the transmission order of jobs to the post-processing apparatus 4 in question is reversed from the transmission order of jobs to the post-processing apparatus 4 in the previous step. For example, if the transmission order of jobs to the post-processing apparatus 4 in the immediately prior step was forward order, the transmission order of jobs to the post-processing apparatus 4 in question is set to reverse order. Conversely, if the orientation of paper discharge of the post-processing apparatus 4 in question is different from that of the post-processing apparatus 4 used in the immediately prior step, the flow proceeds to step S24, and the job transmission order is set to be the same as that of the post-processing apparatus 4 in the immediately prior step.

Next, control up to the decision as to the paper discharge side of a print job, the page order, and the job transmission order in the second embodiment will be described through reference to FIG. 10 and FIGS. 11A to 11E, using the step of the jacket 34 as an example. We will assume that the job controller 8 processes jobs in the order of job 1, job 2, and job 3.

First, with the post-processing step information 10 in FIG. 5, the jacket 34 is subjected to post-processing by the laminator 38 and the creasing machine 37, in that order. At the laminator 38, according to the post-processing step information 10 and the sheet feed/discharge information 11, which is the first post-processing step, the jacket 34 is fed face-down to the laminator 38, and is discharged face-down (the same orientation as the feed) from the laminator 38. Thus, the paper discharge side, the page order setting, and the job transmission order that take laminator processing into account are decided according to the flowchart in FIG. 8.

Next, the transmission order of jobs to the creasing machine 37, which is the second post-processing step, is decided according to the flowchart in FIG. 10. First, in step S21, the transmission order of jobs to the devices in the previous steps (here, the printing apparatus 3 and the laminator 38) is reversed. Thus, the order of jobs transmitted to the printing apparatus 3 and the laminator 38 becomes the reverse order, so that the order is job 3, job 2, and job 1.

FIG. 11A depicts a side view of the printed matters discharged from the printing apparatus 3 when the job order has been set to reverse order. Here, the printing starts from job 3, and that printed matter is discharged. Accordingly, the printed matter of job 1 is discharged at the very top on the paper discharge tray 1101, and the printed matter of job 3 is discharged at the very bottom. The paper discharge in this case is "face-up discharge" just as in FIG. 9A, so the front of the printed matter is facing upward.

FIG. 11B depicts a side view of the printed matters after the stack of printed matter in FIG. 11A has been turned over and placed on the paper feed tray 1102 of the laminator 38. FIG. 11C depicts a side view of the printed matters after they have been discharged from the laminator 38. The printed matter of the jacket 34 needs to be fed face-down to the laminator 38, so the printed matter stacked as in FIG. 11A is fed in a state in which the back side is facing upward as in FIG. 11B. Here, the printed matter of job 1 is placed at the very bottom on the paper feed tray 1102, and the printed matter of job 3 is placed at the very top. Since the jobs were transmitted and printed in reverse order in the previous step, lamination is performed starting from the printed matter of job 3.

Then, in step S22, it is determined whether the paper discharge orientation is the same for the creasing machine 37, which is the next post-processing apparatus 4, and the laminator 38, which was the post-processing apparatus 4 in the previous step. As discussed above, it can be seen from FIG. 6 that the paper discharge of the laminator 38 is "face-down discharge." On the other hand, it can be seen that the paper discharge of the creasing machine 37 is "face-down discharge" because of the post-processing step information 10 and the sheet feed/discharge information 11 of the post-processing apparatus. Thus, in step S22, it is determined that the paper discharge orientation of the laminator 38 is the same as the paper discharge orientation of the creasing machine 37, and the flow proceeds to step S23. In step S23, the transmission order of jobs to the creasing machine 37 is decided. Here, since the transmission order of jobs to the laminator 38, which is the post-processing apparatus 4 in the immediately prior step, is the reverse order, the transmission order of jobs to the creasing machine 37 is decided to be the opposite thereof, or the forward order.

FIG. 11D depicts a side view of the printed matters when the printed matter in FIG. 11C has been placed directly in a paper feed tray 1103 of the creasing machine 37. FIG. 11E depicts a side view of the printed matters discharged from the creasing machine 37 onto a paper discharge tray 1104. The paper discharge method with the creasing machine 37 is "same orientation as paper feed" (FIG. 6), so the printed matter on the paper discharge tray 1104 is "face-down discharge," and the order of the printed matter (the job order) is in the order of job 1 to job 3, starting from the bottom, on the paper discharge tray 1104.

Since it is necessary that the printed matter of the jacket 34 here is fed face-down to the creasing machine 37, the stack of discharged printed matter is fed in a state in which the back side is facing upward, as in FIG. 11C. Thus, the printed matter of job 1 is placed at the very top on the paper feed tray 1103, and the printed matter of job 3 is placed at the very bottom. Since the jobs are transmitted in forward order to the creasing machine 37, processing is performed starting from the printed matter of job 1, which is the printed matter at the top, for mechanical reasons.

As a result of the above, the stack of printed matters shown in FIG. 11E is turned over so that the front of the printed matter is facing up, and the stack of printed matter that is finally outputted is arranged in order starting from the printed matter of job 1. Consequently, since the arrangement is in the same order as in the example of the wrapper band 33 shown in FIG. 9D, there is no need to rearrange the printed matters when the wrapper band 33 and the jacket 34 are put together with the front cover and the body that have undergone case binding.

As described above, with the second embodiment, in using a plurality of post-processing apparatuses 4 to produce a photobook, the orientation of the printed matter discharged from the printing apparatus 3, the order of the pages of the discharged printed matter, and the job transmission order are controlled just as in the first embodiment given above. Consequently, this eliminates the work of rearranging the printed matters during paper feed to the post-processing apparatuses. Also, since the parts can be put together without the operator having to rearrange the order of the jobs or pages, the worker's efficiency can be improved.

Third Embodiment

In the first and second embodiments given above, the discharge side of the printed matter, the page order, and the job transmission order (job execution order) were automatically decided according to the capability of the post-processing apparatus or to the post-processing information for each part. However, since the printed matters are manually conveyed to the paper feeder of the post-processing apparatus 4 and fed in, it sometimes cannot be discerned intuitively which printed matter is at the front, and which way the printed matter should be oriented. Accordingly, there is the risk that the printed matter will be fed in the wrong orientation to the post-processing apparatus 4, and the desired post-processing results may not be obtained.

In view of this, in the third embodiment, we will describe processing in which printed matter (paper) for designating the orientation in feed to the post-processing apparatus 4 is inserted at the beginning or end of each stack of parts. The system configuration according to the third embodiment (FIG. 1) and the hardware configuration of the information processing apparatus are the same as those in the first embodiment given above, and will therefore not be described again.

Figure 12:
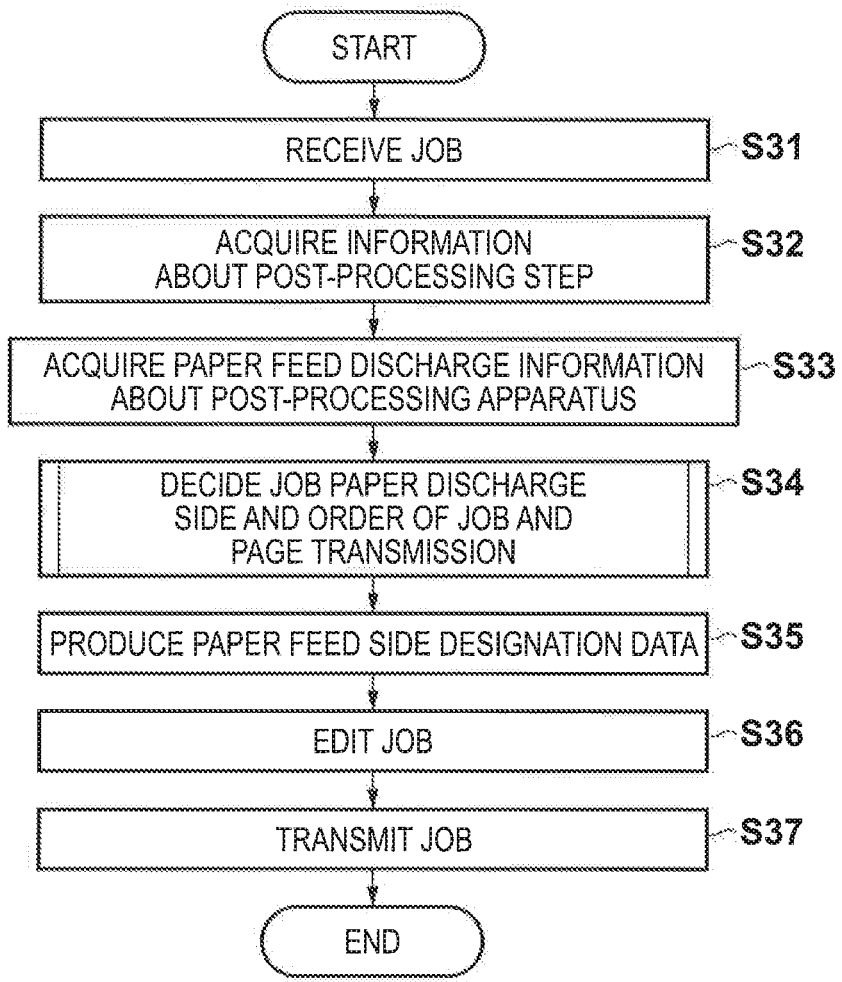
FIG. 12 is a flowchart for describing an example of transmission control processing in a job performed by the information processing apparatus according to a third embodiment.

FIG. 12 is a flowchart for describing an example in which paper feed side designation data is produced, which is executed by the information processing apparatus 2 according to the third embodiment of the present invention. The program that executes this processing is stored on the hard disk 23 of the information processing apparatus 2, developed in the RAM 22 during execution, and executed under the control of the CPU 21.

The processing of steps S31 to S34 in FIG. 12 is the same as the processing in steps S1 to 34 in FIG. 7, and therefore will not be described again.

After step S34, the flow proceeds to step S35, and the job editor 12 produces paper feed side designation data. Designation data content is produced for each part and in a quantity corresponding to the number of post-processing apparatuses 4 being used. Then, the flow proceeds to step S36, and a job ticket for printing paper feed side designation data is produced. This includes, for example, control over whether the discharge setting will be face-up or face-down, and which orientation the printed matter will be discharged, just as with the part jobs. Finally, the flow proceeds to step S37, and the device manager 9 transmits to the printing apparatus 3 the paper feed side designation data content produced in step S35 and the job ticket for printing paper feed side designation data produced in step S36, in addition to the jobs illustrated in FIG. 4. It is decided here, based on the orientation of paper feed to the post-processing apparatus 4, whether the printed matter printed with the paper feed side designation data will be discharged at the beginning or the end.

Figure 13:
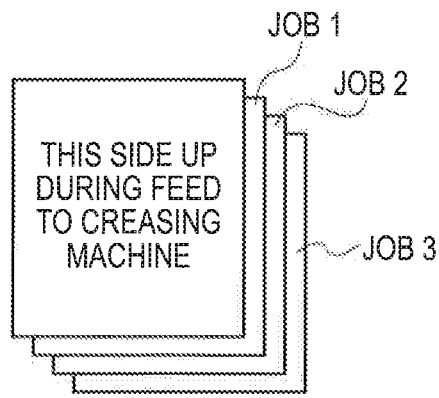
FIG. 13 depicts a view illustrating en example of the printing of paper feed side designation data for a part (wrapper band).

FIG. 13 shows an example of the printing of paper feed side designation data for a part (wrapper band), and pertains to the third embodiment.

The paper feed side designation data is printed, for example, as "this side up during feed so creasing machine," as shown in FIG. 13, and tells a worker which side of the printed matter is the front during paper feed. In the above-mentioned FIG. 5, paper feed to the creasing machine 37 is "face-down feed," so the printed matter for the wrapper band 33 is fed with the back side facing up. When the paper feed side designation data is transmitted to the printing apparatus 3, is transmitted ahead of job 1, and "this side up during feed to creasing machine" is printed on the sheet. Upon completion of the printing of this message, the paper printed with the paper feed side designation data is discharged on top of the printed matter of job 1. Therefore, a worker can check this information to confirm the order of the printed matter during feed to the creasing machine 37.

As described above, with the third embodiment, when printed matter is discharged from the printing apparatus 3, a paper printed with data designating which way to orient the printed matter is outputted. Consequently, a worker can confirm which way to feed the printed matter to the post-processing apparatus 4 used for each part, and this prevents the printed matter from being fed in the wrong orientation.

As described above, with this embodiment, a post-processing step can be executed for each type of printed matter on the basis of the discharge order of the printed matter, so there is no need to rearrange the printed matter during feed to the post-processing apparatus.

Also, there is no need to rearrange the order of the jobs used to obtain the printed matters.

Also, since the printed matter is in the right order for each type, there is no need to search for corresponding types of printed matter and rearrange them.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-026529, filed Feb. 9, 2011 which is hereby incorporated by reference herein in its entirety.

What is claimed is:

1. An information processing apparatus that controls execution of jobs performed by a printing apparatus and by a post-processing apparatus that performs post-processing in which printed matter printed by the printing apparatus is used, the apparatus comprising:
a storing unit configured to store post-processing step information including information about a post-processing apparatus used in a step of post-processing for a plurality of kinds of printed matter printed by the printing apparatus, and paper feed information indicating whether to feed paper face-up or face-down to the post-processing apparatus;
a storage unit configured to store sheet feed/discharge information related to paper feed to the post-processing apparatus and paper discharge from the post-processing apparatus;
an acquisition unit configured to acquire, on the basis of a plurality of jobs that designate the execution of printing with the printing apparatus and post-processing with the post-processing apparatus, post-processing step information for the post-processing apparatus designated by the plurality of jobs, and sheet feed/discharge information related to paper feed to the post-processing apparatus and paper discharge from the post-processing apparatus;
a determination unit configured to determine, on the basis of the post-processing step information and the sheet feed/discharge information, whether to put the front of the printed matter discharged from the printing apparatus face-up or face-down with respect to each of a plurality of types of printed matter, and the order in which the plurality of jobs are to be executed in the post-processing;
an edit unit configured to edit the plurality of jobs on the basis of the execution order and whether the front of the printed matter discharged from the printing apparatus is face-up or face-down as determined by the determination unit; and
a transmission unit configured to transmit the plurality of jobs edited by the edit unit to the printing apparatus and the post-processing apparatus,
wherein, in a case that there are a plurality of pages of the printed matter printed in a single job, and the sheet feed/discharge information indicates that the orientations of paper feed and discharge of the post-processing apparatus are different, the determination unit determines that an order of the pages of printed matter discharged from the printing apparatus is in forward order.

2. The information processing apparatus according to claim 1,
wherein the printed matter discharged from the printing apparatus is conveyed manually to a paper feeder of the post-processing apparatus, and placed in the paper feeder, and
the front of the printed matter discharged from the printing apparatus is set to be reversed with respect to the front of the printed matter discharged from the post-processing apparatus.

3. The information processing apparatus according to claim 1,
wherein in a case that there are a plurality of pages of the printed matter printed in a single job, and the sheet feed/discharge information indicates that the paper feed and discharge of the post-processing apparatus are both either face-up or face-down, the determination unit determines that an order of the pages of printed matter discharged from the printing apparatus is in reverse order.

4. The information processing apparatus according to claim 1,
wherein in a case that the sheet feed/discharge information indicates that the discharge of paper from the post-processing apparatus is face-down discharge, the determination unit determines that an order of a plurality of jobs are executed by the printing apparatus is forward order.

5. The information processing apparatus according to claim 1,
wherein in a case that the sheet feed/discharge information indicates that the discharge of paper from the post-processing apparatus is face-up discharge, the determination unit determines that the order of a plurality of jobs are executed by the printing apparatus is reverse order.

6. The information processing apparatus according to claim 1,
wherein in a case that the post-processing includes a plurality of post-processing steps performed by a plurality of post-processing apparatuses,
if the order of execution of jobs in a previous post-processing step is reversed, and the paper discharge from the post-processing apparatus used in a subsequent post-processing step and in a previous post-processing step are both either face-up or face-down, the jobs executed in the subsequent post-processing step are in the reverse order from the order of execution of jobs in the previous post-processing step.

7. The information processing apparatus according to claim 1,
wherein in a case that the post-processing includes a plurality of post-processing steps performed by a plurality of post-processing apparatuses,
if the order of execution of jobs in a previous post-processing step is reversed, and the orientations of paper discharge from the post-processing apparatus used in a subsequent post-processing step and in a previous post-processing step are mutually different, the jobs executed in the subsequent post-processing step are in the same order as the order of execution of jobs in the previous post-processing step.

8. The information processing apparatus according to claim 1,
wherein the plurality of jobs include a job in which the printing apparatus prints paper feed side designation data that designates the front of the printed matter fed to a paper feeder of the post-processing apparatus, further comprising an adding unit configured to add a printed matter printed with the paper feed side designation data to printed matter discharged from the printing apparatus.

9. A control method for controlling an information processing apparatus, which controls the execution of jobs performed by a printing apparatus and by a post-processing apparatus that performs post-processing in which printed matter printed by the printing apparatus is used, the method comprising:

storing post-processing step information including information about a post-processing apparatus used in a step of post-processing for a plurality of kinds of printed matter printed by the printing apparatus, and paper feed information indicating whether to feed paper face-up or face-down to the post-processing apparatus;

storing sheet feed/discharge information related to paper feed to the post-processing apparatus and paper discharge from the post-processing apparatus;

acquiring, on the basis of a plurality of jobs that designate the execution of printing with the printing apparatus and post-processing with the post-processing apparatus, post-processing step information for the post-processing apparatus designated by the plurality of jobs, and sheet feed/discharge information related to paper feed to the post-processing apparatus and paper discharge from the post-processing apparatus;

determining, on the basis of the post-processing step information and the sheet feed/discharge information, whether to put the front of the printed matter discharged from the printing apparatus face-up or face-down with respect to each of a plurality of types of printed matter, and the order in which the plurality of jobs are to be executed in the post-processing;

editing the plurality of jobs on the basis of the execution order and whether the front of the printed matter discharged from the printing apparatus is face-up or face-down; and transmitting the edited plurality of jobs to the printing apparatus and the post-processing apparatus, wherein, in a case that there are a plurality of pages of the printed matter printed in a single job, and the sheet feed/discharge information indicates that the orientations of paper feed and discharge of the post-processing apparatus are different, it is determined that an order of the pages of printed matter discharged from the printing apparatus is in forward order.

* * * * *